Feb. 10, 1925. Re. 15,993
C. W. PETERSON
ELECTRICAL SOUND CONVERTING APPARATUS
Original Filed Aug. 2, 1922
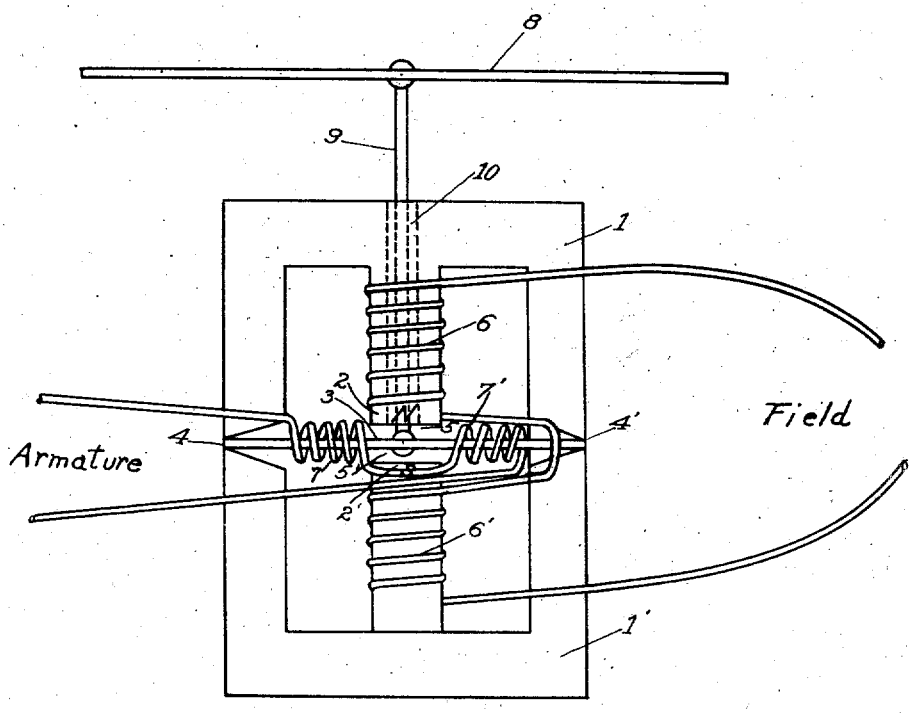
INVENTOR
Charles W. Peterson
BY
Allen Allen
ATTORNEYS Reissued Feb. 10, 1925. Re. 15,993

UNITED STATES PATENT OFFICE.

CHARLES W. PETERSON, OF ANN ARBOR, MICHIGAN.

ELECTRICAL SOUND-CONVERTING APPARATUS.

Original No. 1,491,208, dated April 22, 1924, Serial No. 579,283, filed August 2, 1922. Application for reissue filed November 20, 1924. Serial No. 751,190.

*To all whom it may concern:*

Be it known that I, CHARLES W. PETERSON, a citizen of the United States, and residing at Ann Arbor, county of Washtenaw, and State of Michigan, have invented certain new and useful Improvements in Electrical Sound-Converting Apparatus, of which the following is a full, clear, and exact description, reference being had to the accompanying drawing, forming part of this specification.

My invention relates to improvements in the electromagnetic operating system, of the general class of apparatus, known as "telephone receivers," and more especially of the class known as "loud speakers." It may also be used as a telephone transmitter.

The objects of my invention are to provide an electromagnetic operating system for sound reproducing or converting apparatus, in which the efficiency in converting electrical pulsations into mechanical vibration and sound waves, and conversely of converting sound waves and mechanical vibrations into alternating electric currents, is unusually high, to provide such a device in which there are no movable coils or flexible connections to get out of order; and to provide a magnetic system which takes a very small amount of field current.

My invention may be clearly understood by reference to the accompanying schematic drawing in which 1—1′ represents an iron core, preferably laminated, with pole pieces 2 and 2′, 3 is a flexible iron armature held in place in the yoke at its outer ends 4 and 4′, and clearing the pole pieces at its center by small air gaps 5 and 5′, around the pole pieces are field coils 6 and 6′, 7 and 7′ around the armature but not touching it are the operating coils, 8 is a diaphragm, 9 is a link connecting diaphragm 8 to armature 3, and 10 is a hole through pole piece 2 for link 9 to pass through.

The operation of the device is as follows: The "field" wires are connected to a suitable source of direct current and the pole tips 2 and 2′ become very strongly magnetized N and S as is shown in the drawing. Now when the alternatng operating current is connected to the "armature" wires, the center of armature 3 becomes magnetized alternately N and S once for each alternation of the operating current. When the center of the armature is "N," the armature is strongly repelled from the strong N field pole and at the same time is strongly attracted by the strong S field pole, and this results in the armature springing downward nearer pole 2′ than pole 2, and this downward motion is transmitted through link 9 to diaphragm 8 and then to the air. Similarly when the center of the armature is "S," diaphragm 8 is pushed upwardly, which causes a compression half of a sound wave to be formed. Conversely, when sound waves strike diaphragm 8 armature 3 is made to vibrate which causes an alternating flux to flow through the armature iron inside of armature coils 7 and 7′, and this induces an E. M. F. in the armature coils in accordance with the sound waves, and hence the device can be used as a transmitter.

The great efficiency of the device as a loud speaker comes from the fact that there is such a direct interaction between the strong field flux and the armature flux right at the point of the armature where the force is transmitted to the diaphragm, from there being paths of such low reluctance for both the field flux and armature flux as is possible by this design, and from the fact that the whole core may be laminated, thereby doing away with most of the eddy current losses. The field flux density is kept relatively low so that the core offers a good permeable return path for the armature flux. The air gaps 5 and 5′ are made short also to keep the reluctance low, but allow plenty of room for vibration of armature 3. No field flux flows through the armature and this leaves the armature in a very permeable condition for the alternating armature flux.

It might be thought that one of the field coils could be eliminated and twice the number of ampere turns put on the remaining coil without impairing the operation of the device, but this is not the case since the one field coil would act as a short circuited secondary coil to the alternating armature flux. When two field coils of equal numbers of turns are used tho, as in the drawing, the voltage induced in each coil is in the opposite direction so that by the combination of the two coils in series, no induced alternating current flows in the field circuit. One armature coil tho, and that end of the armature that was inside of this coil, could be eliminated without destroying the principle of this invention, but would reduce the efficiency somewhat.

Having thus described my invention, so that anyone skilled in the art pertaining thereto can make and use the same, I claim:

1. In an electrical sound reproducing apparatus, the combination of a shell type laminated core with the center part divided into two poles with an air gap between them, a field coil on each pole the two being connected in series and arranged to magnetize one pole N and the other pole S, a flexible armature with each end magnetically connected to the yokes of the field core in such a way that the center of the armature lies between the field poles, armature coils around each end of the armature but not touching same and connected so that both produce the same magnetic polarity in the part of the armature between the field poles, a diaphragm, and a connecting link to transmit the vibrations of the armature to the diaphragm.

2. In an apparatus used to convert audio electrical variations into vibrations and sound waves, or sound waves and vibrations into electrical variations, a combination consisting of a laminated iron core with two field poles which are magnetized N and S by a D. C. electric current through two field coils connected in series, an iron armature, a movable part of which plies in the air gap between the two field poles and part of which is magnetically close or connected to the neutral part of the core yoke, armature coils around the part or parts of the armature extending from the yoke to the air gap between the field poles, and a link to connect the movable part of the armature to the diaphragm or other vibration recording or producing apparatus.

3. In an electrical sound reproducing apparatus, the combination of a magnet element having yokes and a center part divided into two poles with an air gap between them, one a south pole and one a north pole, a flexible armature magnetically connected to the yokes of the magnet element in such a way that the center of the armature lies between the two above noted poles, armature coils around each end of the armature and connected so that both produce the same magnetic polarity in the part of the armature between the two said poles, a diaphragm, and connecting means to transmit the vibrations of the armature to the diaphragm.

4. In an apparatus used to convert audio electrical variations into vibrations and sound waves or sound waves and vibrations into electrical variations, a combination consisting of a magnet element having opposed interspaced north and south poles, and at least two surrounding yokes, an iron armature, a movable part of which plies in the air gap between the two poles, and part of which is magnetically close or connected to the neutral part of the yokes, armature coils around the parts of the armature extending from the yoke to the air gap between the poles, at opposite sides of the poles and means to connect the movable part of the armature to a diaphragm or other vibration recording or producing member.

5. In a radio loud speaker, the combination of a magnet element formed of E shaped sections facing each other with the central arms terminating in north and south poles respectively, with an air gap between them, a resilient armature located with its central point in said air gap and with its ends mounted close to the median points of the lateral arms of the E shaped parts, and coils mounted around the armature between the central and lateral portions of the magnet element, and connection from the armature to a diaphragm.

CHARLES W. PETERSON.